United States Patent
Kroehling

(10) Patent No.: US 11,971,807 B2
(45) Date of Patent: Apr. 30, 2024

(54) SOFTWARE-DEVELOPMENT TOOL FOR PRESENTING TELEMETRY DATA WITH ASSOCIATED SOURCE CODE

(71) Applicant: Red Hat, Inc., Raleigh, NC (US)

(72) Inventor: Juraci Paixao Kroehling, Berlin (DE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/551,390

(22) Filed: Dec. 15, 2021

(65) Prior Publication Data
US 2023/0185696 A1     Jun. 15, 2023

(51) Int. Cl.
G06F 11/36      (2006.01)
G06F 3/04817    (2022.01)
G06F 8/77       (2018.01)

(52) U.S. Cl.
CPC ...... *G06F 11/3644* (2013.01); *G06F 3/04817* (2013.01); *G06F 8/77* (2013.01); *G06F 11/3656* (2013.01)

(58) Field of Classification Search
None
See application file for complete search history.

(56) References Cited

U.S. PATENT DOCUMENTS

| | | | |
|---|---|---|---|
| 8,762,939 B1 * | 6/2014 | Ulug | H04L 45/02 717/109 |
| 9,448,913 B2 | 9/2016 | Hoffmann | |
| 10,095,602 B2 | 10/2018 | Gautam et al. | |
| 10,114,636 B2 | 10/2018 | Lehner et al. | |
| 10,353,796 B2 | 7/2019 | Frenkiel et al. | |
| 10,635,566 B1 * | 4/2020 | Talluri | G06F 9/4488 |
| 11,347,622 B1 * | 5/2022 | Agarwal | G06F 11/3466 |
| 2006/0271917 A1 * | 11/2006 | Das | G06F 8/73 717/130 |
| 2011/0047531 A1 * | 2/2011 | Wang | G06F 11/3676 717/130 |
| 2013/0036375 A1 * | 2/2013 | Zavatone | G06F 8/38 715/763 |
| 2014/0282430 A1 * | 9/2014 | Kew | G06F 11/3644 717/130 |

(Continued)

OTHER PUBLICATIONS

D. Rothlisberger et al., "Augmenting static source views in IDEs with dynamic metrics," 2009 IEEE International Conference on Software Maintenance, Edmonton, AB, Canada, 2009, pp. 253-262, doi: 10.1109/ICSM.2009.5306302. (Year: 2009).*

(Continued)

*Primary Examiner* — Andrew M. Lyons
(74) *Attorney, Agent, or Firm* — Kilpatrick Townsend & Stockton LLP

(57) ABSTRACT

A software-development tool can present telemetry data with associated source code. For example, a computing device can identify, by a text editor, source code of a software application that is associated with telemetry data of performance metrics associated with running the source code. The computing device can display, by the text editor, an icon with the source code. The icon can indicate the source code is associated with the telemetry data. The computing device can receive an interaction with the icon. In response to receiving the interaction, the computing device can retrieve, by the text editor, the telemetry data from a telemetry-data repository for display in the text editor.

20 Claims, 4 Drawing Sheets

(56) References Cited

U.S. PATENT DOCUMENTS

2014/0331212 A1* 11/2014 Gaikwad ............. G06F 11/3684
                                                717/131
2015/0363303 A1* 12/2015 Argenti ................ G06F 9/4856
                                                717/131
2016/0306613 A1   10/2016 Busi et al.
2018/0211046 A1    7/2018 Muttik et al.
2019/0129813 A1*  5/2019 Sankarasubramanian ..................
                                                G06F 11/3409
2019/0213355 A1*  7/2019 Raviv .................... H04L 51/04
2020/0409781 A1* 12/2020 Zhen ................... G06F 11/3006
2021/0191840 A1    6/2021 Shah et al.
2021/0263834 A1*  8/2021 Reisner ............... G06F 11/3624

OTHER PUBLICATIONS

X. Liu and R. Holmes, "Exploring Developer Preferences for Visualizing External Information Within Source Code Editors," 2020 Working Conference on Software Visualization (VISSOFT), Adelaide, SA, Australia, 2020, pp. 27-37, doi: 10.1109/VISSOFT51673.2020.00008. (Year: 2020).*

M. Sulir and J. Porubän, "Labeling source code with metadata: A survey and taxonomy," 2017 Federated Conference on Computer Science and Information Systems (FedCSIS), Prague, Czech Republic, 2017, pp. 721-729, doi: 10.15439/2017F229. (Year: 2017).*

* cited by examiner

SOFTWARE-DEVELOPMENT TOOL FOR PRESENTING TELEMETRY DATA WITH ASSOCIATED SOURCE CODE

TECHNICAL FIELD

The present disclosure relates generally to software development. More specifically, but not by way of limitation, this disclosure relates to a software-development tool for presenting telemetry data with associated source code.

BACKGROUND

Some software-development processes can involve a software developer instrumenting source code for a software application. The instrumentation can be used to generate telemetry data while the software application runs in production. Telemetry data can include logs, metrics, traces, and other performance measurements for the software application. The software developer may decide to access the telemetry data if the software application is performing suboptimally.

DETAILED DESCRIPTION

Figure 1:
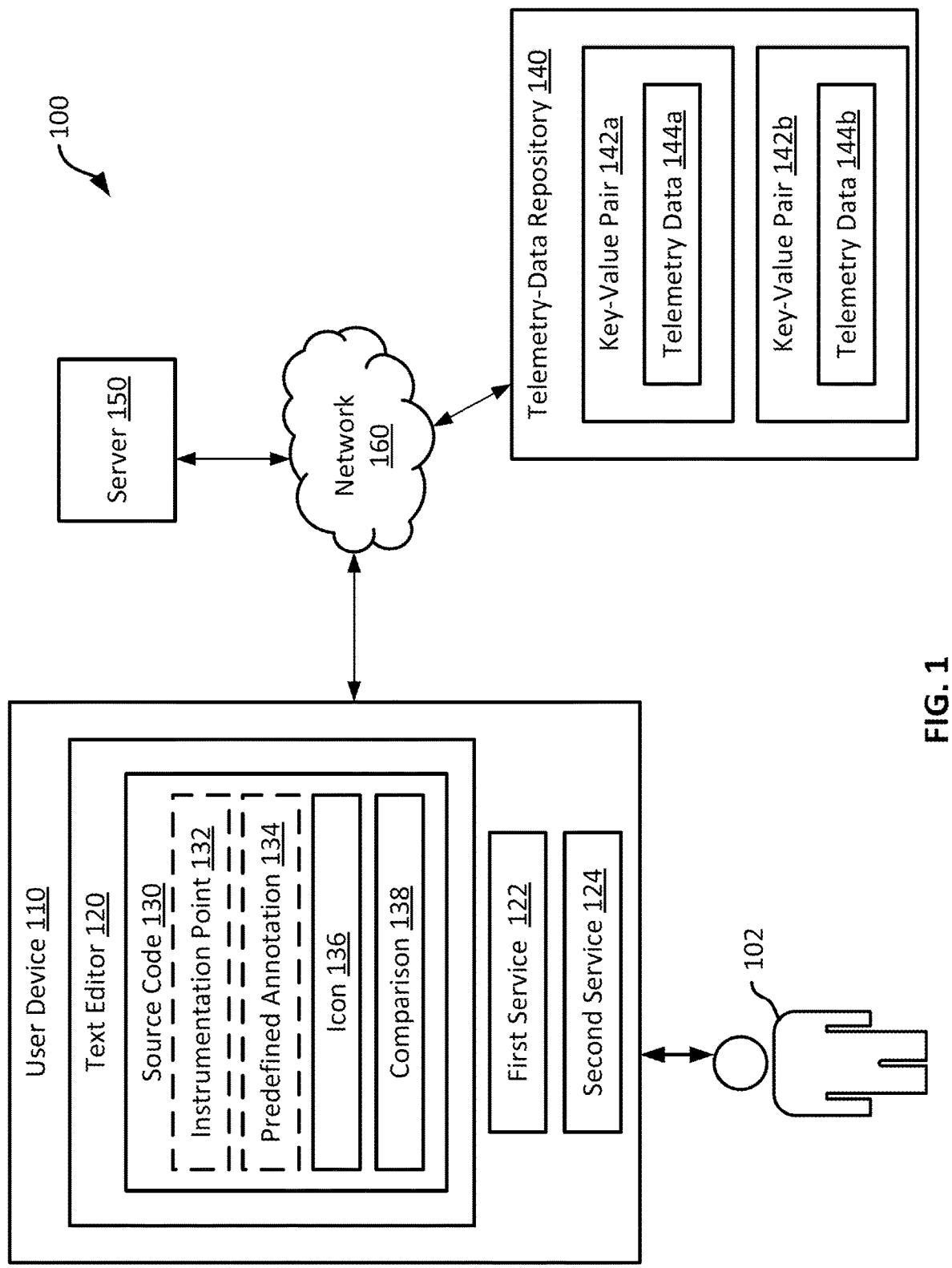
FIG. 1 is a block diagram of an example of a system for implementing a software-development tool for presenting telemetry data with associated source code according to some aspects of the present disclosure.

Telemetry data, such as logs, metrics, and trace information for source code of a software application can be generated by running the software application in production. A software developer may receive a report about the software application. The report may indicate undesirable behavior of the software application. The software developer can then attempt to identify a cause for the undesirable behavior by analyzing the telemetry data. To locate the telemetry data, the software developer may access multiple telemetry tools. Each of the tools may be associated with a particular type of telemetry data. For example, the software developer may access separate telemetry tools for log information, metric counters, and traces for the software application. Once the software developer identifies telemetry data that might explain the undesirable behavior, the software developer can return to the source code to attempt to identify which portion of the source code is causing the undesirable behavior. But, the software developer may not be able to tell which portion of the source code is associated with the identified telemetry data, so the process of editing the source code to mitigate the undesirable behavior may be computationally intensive and time intensive. Additionally, navigating between the various telemetry tools to locate the relevant telemetry data can also contribute to the computational and time requirements for improving source code.

Some examples of the present disclosure can overcome one or more of the abovementioned problems by providing a software-development tool configured to present telemetry data with associated source code. The software-development tool can include a text editor. The text editor can identify source code of a software application that is associated with telemetry data. The text editor may identify an instrumentation point or a predefined annotation that indicates the source code is associated with the telemetry data. The text editor can display an icon with the source code that can indicate that the source code is associated with the telemetry data. The text editor can receive an interaction with the icon and, in response, the text editor can retrieve the telemetry data from a telemetry-data repository for display in the text editor. As a result, the telemetry data can be displayed with the relevant source code, reducing the time and resources involved in locating telemetry data and corresponding source code.

As a more specific example, a user can draft a source code for a software application on a user device using a text editor. The source code can describe a checkout operation for the software application. To aid the user in developing the source code, the user may have downloaded and installed a software-development tool that is a plugin for the text editor. A plugin can be a software component that adds a specific feature or functionality to an existing computer program. As the user drafts the source code in the text editor, the software-development tool plugin can automatically search the software description and determine that the source code includes an instrumentation point for the checkout operation. Based on the instrumentation point, the software-development tool plugin can display an icon that the user can interact with to visualize telemetry data for the checkout operation. Upon the user clicking or hovering over the icon, the software-development tool plugin can retrieve the telemetry data, which can include latency metrics for the checkout operation. The software-development tool plugin displays the latency metrics to the user, who can then determine whether the source code is to be updated to improve latency of the checkout operation. The real-time indication of the telemetry data can reduce the system computation and time for locating and updating source code that may be associated with undesirable performance metrics.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing a software-development tool for presenting telemetry data with associated source code according to some aspects of the present disclosure. The system 100 can include a user device 110. Examples of the user device 110 can include a laptop computer, desktop computer, server, mobile phone, etc. The system 100 can additionally include a server 150 and a telemetry-data repository 140. As shown in FIG. 1, some or all of these components can communicate with one another via a network 160, such as a local area network (LAN) or the Internet.

In some examples, the user device 110 can include a software-development tool, which may be part of a text editor 120, which can be part of a website, a standalone application, a word processor, an integrated development environment (IDE), etc. A user 102 can interact with the user device 110 to draft source code 130 for a software application in the text editor 120. The source code 130 can be one or more lines of code in any suitable programming language, such as Java or Go. The user 102 may type the source code 130, or may import the source code 130 from another location.

The text editor 120 can identify the source code 130 is associated with telemetry data 144a. The telemetry data 144a can be performance metrics associated with running the source code 130. For example, the telemetry data 144a can be historical log statements, metric counters, or tracing information associated with the source code 130. Further, the telemetry data 144a can include latency measurements, line graphs for metrics, or flame graphs for traces. The telemetry data 144a may be generated from running the source code 130 in production, or from running similar source code in production. In some examples, the text editor 120 can identify each portion of the source code 130 that is associated with telemetry data. For example, the text editor may identify multiple lines of the source code 130 that are each associated with different telemetry data. To identify the source code 130 that is associated with the telemetry data 144a, the text editor 120 can determine the source code 130 includes an indicator, such as an instrumentation point 132 or a predefined annotation 134. The instrumentation point 132 can be a portion of the source code 130 that specifies what is being measured and a name of an operation associated with the measurement. The text editor 120 may identify the instrumentation point 132 based on byte code associated with the source code 130. As an example, the text editor 120 may look for a specific key in a configuration file of the software application to determine a service name (e.g., "order"). The text editor 120 can then determine that the telemetry-data repository 140 includes a corresponding operation (e.g., "POST checkout") that matches the value of the key.

In some examples, the source code 130 includes the predefined annotation 134 rather than the instrumentation point 132. The predefined annotation 134 can be considered a hint to the text editor 120 that telemetry data exists for the associated source code. The predefined annotation 134 may be a specific character, or string of characters, in the source code 130. For example, the predefined annotation 134 in Go code may be "//+telemetry". The text editor 120 can then identify the text subsequent to the predefined annotation 134 to determine how to locate the telemetry data 144a that is associated with the source code 130. For example, the source code 130 may be "//+telemetry:service-name=order, operation=checkout", so the text editor 120 can determine the telemetry data 144a is related to the service "order" and the operation "checkout".

In some examples, subsequent to identifying that the source code 130 is associated with the telemetry data 144a, the text editor 120 can display an icon 136 with the source code 130. The icon 136 can indicate that the source code 130 is associated with the telemetry data 144a. The text editor 120 can display the icon at the line of code that is associated with the telemetry data 144a, such as at the line of the source code 130 that includes the instrumentation point 132 or the predefined annotation 134. The user 102 can then interact with the icon 136, such as by hovering over or clicking the icon 136 with a mouse.

In response to receiving an interaction with the icon 136, the text editor 120 can retrieve the telemetry data 144a from the telemetry-data repository 140. To retrieve the telemetry data 144a, the text editor 120 can determine a key-value pair 142a associated with the telemetry data 144a based on the source code 130. For example, the key of the key-value pair 142a can be the "service.name", or similar, and the value of the key-value pair 142a can be "order". In other examples, the key of the key-value pair 142a can be "operation.name" and the value of the key-value pair 142a can be "checkout". The text editor 120 can then query the telemetry-data repository 140 for the key-value pair 142a to locate the key-value pair 142. The text editor 120 can retrieve the telemetry data 144a associated with the key-value pair 142a.

Once the text editor 120 retrieves the telemetry data 144a from the telemetry-data repository 140, the text editor 120 can display the telemetry data 144a in the text editor 120. For example, the text editor 120 can display traces, log statements, or metric counters. In some examples, the text editor 120 may display the telemetry data 144a in a flame graph. The user 102 may use the telemetry data 144a to determine whether the source code 130 may be prone to errors. If the user 102 determines that the source code 130 is prone to errors, which may be based on the telemetry data 144a being outside of a desirable range, the user 102 can update the source code 130.

Upon receiving an update to the source code 130, the text editor 120 can determine the source code 130 is associated with telemetry data 144b. The text editor 120 may identify a key-value pair 142b from the instrumentation point 132 or the predefined annotation 134 to determine that the source code 130 is associated with the telemetry data 144b. The text editor 120 can then display the icon 136 with the source code 130. The user 102 can interact with the icon 136 and the text editor 120 can retrieve the telemetry data 144b from the telemetry-data repository 140. The text editor 120 can then display the telemetry data 144b in the text editor 120. In some examples, the telemetry data 144b may be available immediately once the source code 130 is updated, such as if similar source code has been run in production and telemetry data has been generated previously. If similar source code has not run in production, the telemetry data 144b may be generated and the text editor 120 can display the icon 136 subsequent to the source code 130 being run in production.

The source code 130 may be an endpoint that is called by multiple services. By accessing the telemetry-data repository 140, the text editor 120 can indicate upstream services that are calling the source code 130 and downstream services that are being called by the source code 130. For example, the text editor 120 can determine the telemetry data 144a is associated with a first service 122 calling the source code 130 and the telemetry data 144b is associated with a second service 124 calling the source code 130. As an example, the first service 122 is a first tenant of the software application and the second service 124 is a second tenant of the software application. The text editor 120 can determine the telemetry data 144a-b for calls to a checkout service when called by the first tenant and the second tenant, respectively. The text editor 120 can then display the telemetry data 144a-b in the text editor 120. Additionally or alternatively, the text editor 120 can display a comparison 138 of the telemetry data 144a and the telemetry data 144b. The user 102 may use the comparison 138 to determine which service is associated with more desirable telemetry data and may be able to update the source code 130 so that the service associated with the less desirable telemetry data can be improved.

While FIG. 1 shows a specific number and arrangement of components, other examples may involve more components, fewer components, different components, or a different arrangement of the components shown in FIG. 1. Additionally, while the above examples attribute certain functionality to the user device 110, other implementations are possible. For example, at least some of the components and functionality can be offloaded to a server 150. As one particular example, the text editor 120 can be part of a webpage generated by the server 150 and served to the user device 110 over the network 160.

Figure 2:
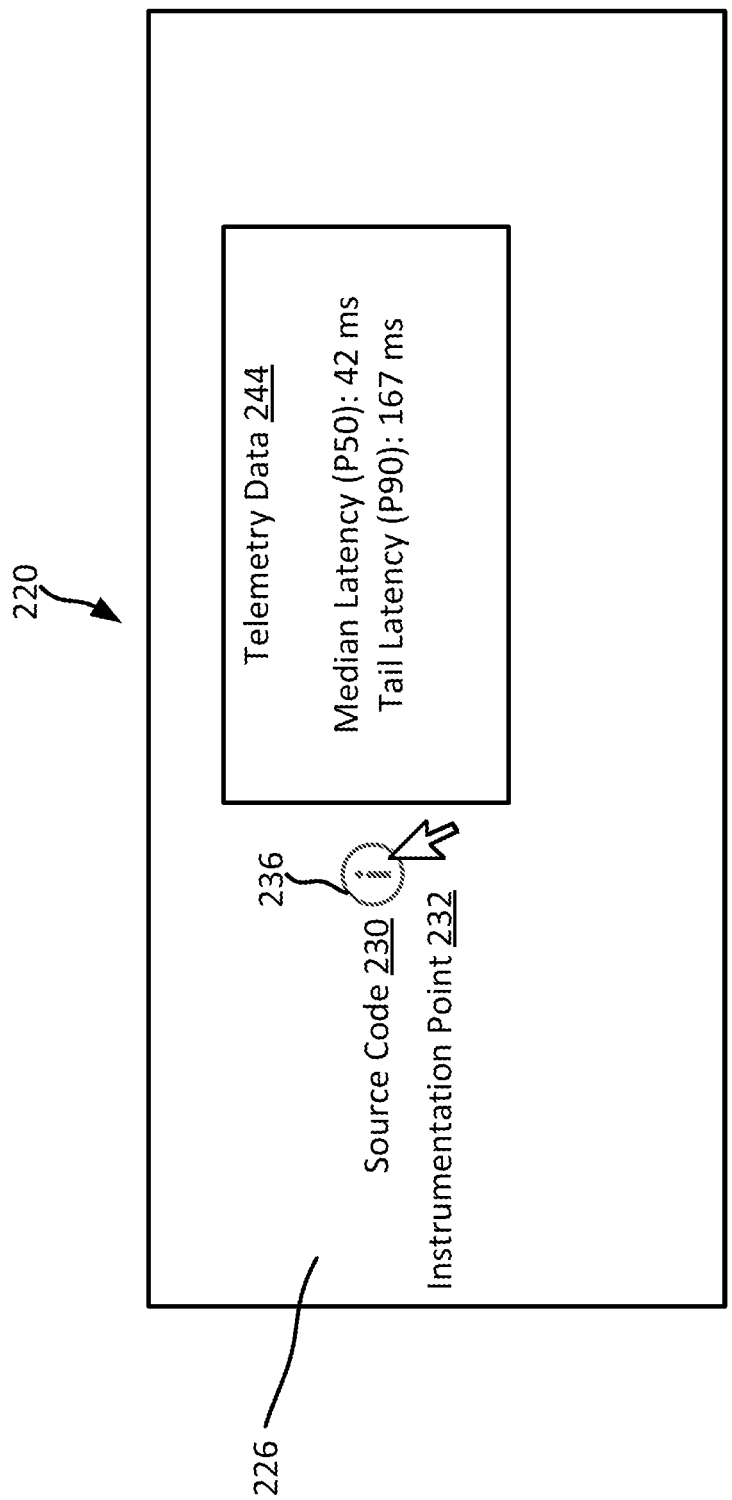
FIG. 2 is a diagram of a graphical user interface for a software-development tool presenting telemetry data according to some aspects of the present disclosure.

FIG. 2 is a diagram of a graphical user interface for a software-development tool presenting telemetry data according to some aspects of the present disclosure. A user, such as a software developer, can navigate to the text editor 220. In some examples, the text editor 220 can include a text box 226 where the user can input source code 230 for a software application. The user can input an instrumentation point 232 as part of the source code 230. The instrumentation point 232 can indicate that there is telemetry data 244 associated with the source code 230.

The text editor 220 can be configured to assist the user in drafting the software application by automatically notifying the user about the telemetry data 244. For example, the text editor 220 can identify the instrumentation point 232 and present an icon 236 indicating there is telemetry data for the source code 230. The user can hover over the icon 136 and the text editor 120 can display the telemetry data 244 to the user. As illustrated in FIG. 2, the telemetry data 244 includes a median latency of 42 ms and a tail latency of 167 ms. The user can use the telemetry data 244 to determine whether to update the source code 230.

While FIG. 2 shows an example of a text editor 220 for illustrative purposes, other examples may involve more components, fewer components, different components, or a different arrangement of the components shown in FIG. 2. For example, although the telemetry data 244 is depicted as a popup window in FIG. 2, in other examples their content can be conveyed to the user using other approaches, such as through a graphical indicator embedded in the text editor 220.

Figure 3:
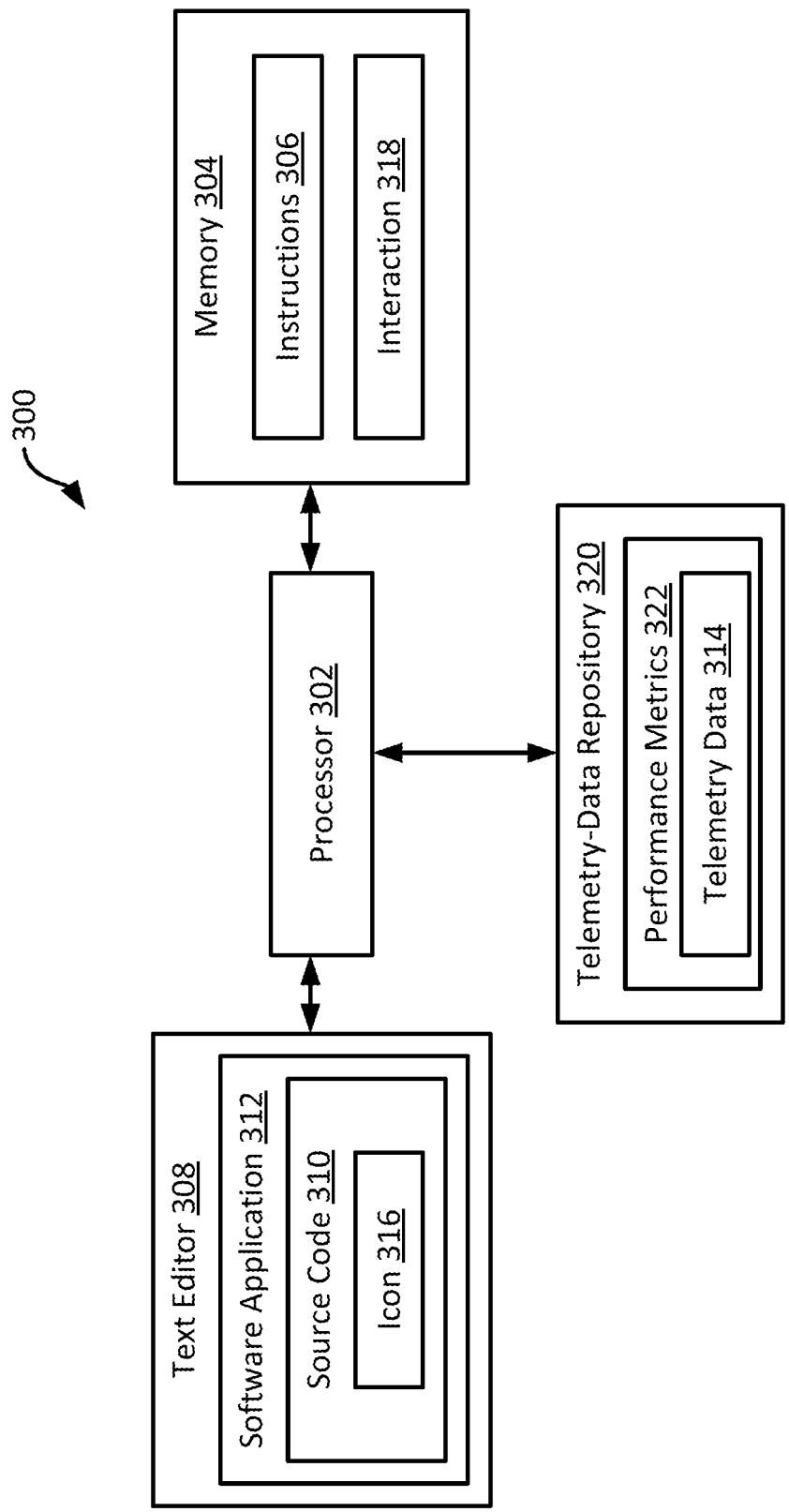
FIG. 3 is a block diagram of another example of a system for implementing a software-development tool for presenting telemetry data with associated source code according to some aspects of the present disclosure.

FIG. 3 is a block diagram of another example of a system 300 for implementing a software-development tool for presenting telemetry data with associated source code according to some aspects of the present disclosure. The system 300 includes a processor 302 communicatively coupled with a memory 304. In some examples, the processor 302 and the memory 304 can be part of the same computing device, such as the user device 110 of FIG. 1. In other examples, the processor 302 and the memory 304 can be distributed from (e.g., remote to) one another.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory computer-readable medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processor 302 can execute instructions 306 to perform various operations. For example, the processor 302 can identify, by a text editor 308, source code 310 of a software application 312 that is associated with telemetry data 314. The telemetry data 314 can be performance metrics 322 associated with running the source code 310. The processor 302 may identify an instrumentation point or a predefined annotation in the source code 310 to determine that the source code 310 is associated with the telemetry data 314. The processor 302 can display, by the text editor 308, an icon 316 with the source code 310. The icon 316 can indicate that the source code 310 is associated with the telemetry data 314. The processor 302 can receive an interaction 318 with the icon 316. The interaction 318 may be a hover over or a click on the icon by a user. In response to receiving the interaction 318, the processor 302 can retrieve, by the text editor 308, the telemetry data 314 from a telemetry-data repository 320 for display in the text editor 308. The processor 302 may determine a key-value pair associated with the telemetry data 314 based on the source code 310, and the processor 302 can locate the key-value pair in the telemetry-data repository 320. By presenting the telemetry data 314 in the text editor 308, the user may not need to access multiple telemetry tools to determine the telemetry data 314 associated with the software application 312. As a result, computing resources and time involved with retrieving the telemetry data 314 and improving the source code 310 to have better performance metrics can be reduced.

Figure 4:
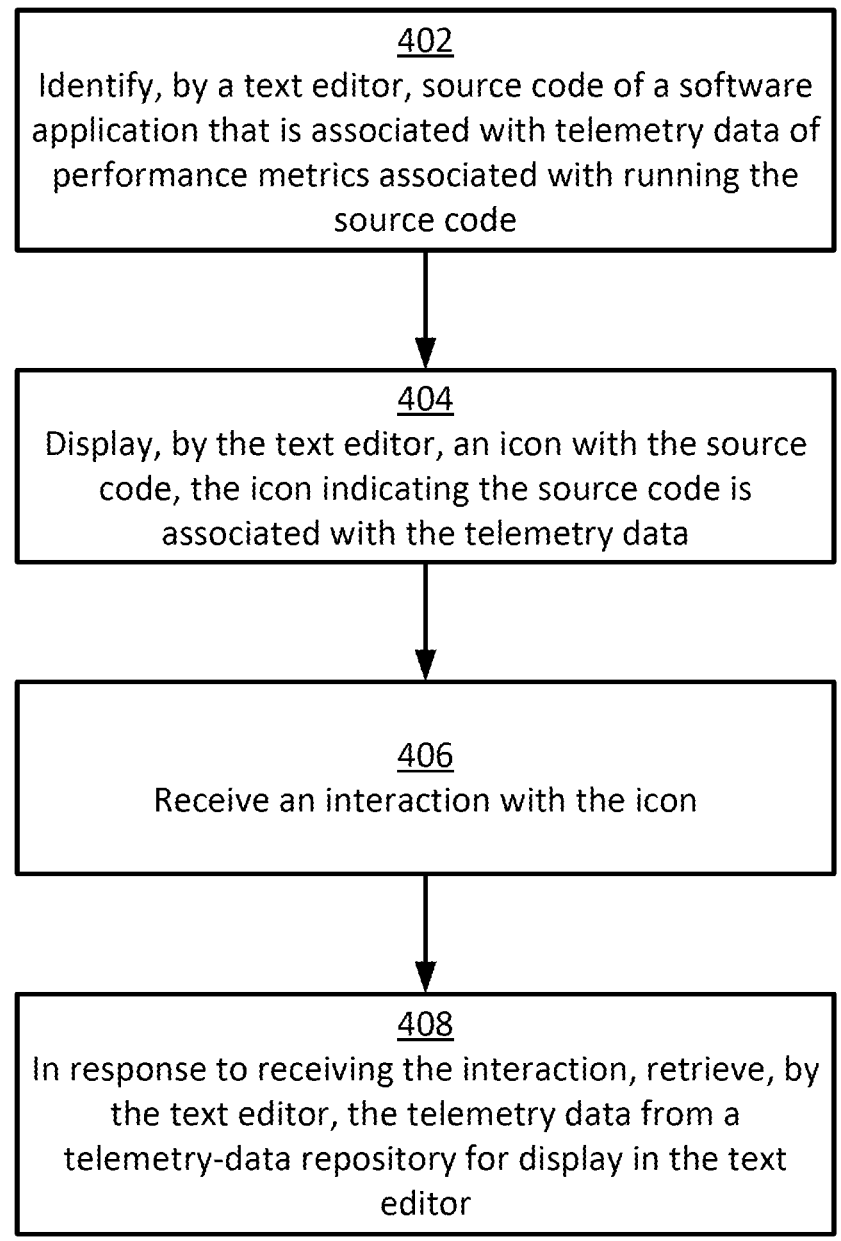
FIG. 4 is a flow chart of an example of a process for implementing a software-development tool for presenting telemetry data with associated source code according to some aspects of the present disclosure.

FIG. 4 is a flow chart of an example of a process for implementing a software-development tool for presenting telemetry data with associated source code according to some aspects of the present disclosure. In some examples, the processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, a processor 302 identifies, by a text editor 308, source code 310 of a software application 312 that is associated with telemetry data 314. The telemetry data 314 can be performance metrics 322 associated with running the source code 310. The source code 310 can include an instrumentation point or a predefined annotation that indicates the source code 310 is associated with the telemetry data 314. The processor 302 can identify the instrumentation point or the predefined annotation to determine that the source code 310 is associated with the telemetry data 314. The telemetry data 314 can include historical log statements, metric counters, tracing information, or other performance metrics associated with the source code 310.

In block 404, the processor 302 displays, by the text editor 308, an icon 316 with the source code 310. The icon 316 indicates the source code 310 is associated with the telemetry data 314. The processor 302 can display the icon 316 on a line of the source code 310 that includes the instrumentation point or the predefined annotation.

In block 406, the processor 302 receives an interaction 318 with the icon 316. The interaction 318 may be a click, hover, or other interaction on the icon 316 from a user.

In block 408, the processor 302, in response to receiving the interaction 318, retrieves, by the text editor 308, the telemetry data 314 from a telemetry-data repository 320 for display in the text editor 308. The telemetry-data repository 320 can store the telemetry data 314 in a key-value pair. The processor 302 can determine the key-value pair associated with the telemetry data 314 based on the source code 310 and locate the key-value pair in the telemetry-data repository 320. The processor 302 can then retrieve the telemetry data 314 and display the telemetry data 314 in the text editor 308. The telemetry data 314 may be displayed as graphs, such as line graphs or flame graphs, in the text editor 308. The processor 302 may additionally display a comparison between telemetry data associated with a first service calling the source code 310 and telemetry data associated with a second service calling the source code 310. Retrieving and displaying the telemetry data for a software application in a text editor can reduce system computation and time for locating and updating source code that may be associated with undesirable performance metrics.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
   a processor; and
   a memory including instructions executable by the processor for causing the processor to:
   detect, by a text editor, a code indicator including at least a predefined annotation in source code of software application, the code indicator comprising one or more predefined characters indicating that the source code has telemetry data of performance metrics associated with running the source code and indicating how to locate the telemetry data;
   display, by the text editor and responsive to detecting the code indicator, an icon with the source code, the icon indicating the source code is associated with the telemetry data;
   receive an interaction with the icon; and
   in response to receiving the interaction, retrieve, by the text editor, the telemetry data from a telemetry-data repository for display in the text editor.

2. The system of claim 1, wherein the code indicator further includes an instrumentation point detectable based on byte code associated with the source code.

3. The system of claim 1, wherein the telemetry data comprises one or more historical log statements, one or more metric counters, or tracing information.

4. The system of claim 1, wherein the memory further includes instructions that are executable by the processor for causing the processor to retrieve the telemetry data by:
   determining a key-value pair associated with the telemetry data based on the source code;
   locating the key-value pair in the telemetry-data repository; and
   retrieving the telemetry data associated with the key-value pair.

5. The system of claim 1, wherein the telemetry data is first telemetry data and the memory further includes instructions that are executable by the processor for causing the processor to:
   receive an update to the source code to generate updated source code;
   determine that the updated source code is associated with second telemetry data;
   display the icon with the updated source code; and
   in response to receiving an additional interaction with the icon, retrieve the second telemetry data from the telemetry-data repository for display in the text editor.

6. The system of claim 1, wherein the source code is an endpoint, the telemetry data is first telemetry data associated with a first service calling the endpoint, and the memory further includes instructions that are executable by the processor for causing the processor to:
   determine second telemetry data associated with a second service calling the endpoint; and
   display, by the text editor, a comparison of the first telemetry data and the second telemetry data.

7. The system of claim 1, wherein the telemetry data comprises historical log statements, metric counters, or tracing information associated with the source code.

8. A method comprising:
   detecting, by a text editor, a code indicator including at least a predefined annotation in source code of software application, the code indicator comprising one or more predefined characters indicating that the source code has telemetry data of performance metrics associated with running the source code and indicating how to locate the telemetry data;
   displaying, by the text editor and responsive to detecting the code indicator, an icon with the source code, the icon indicating the source code is associated with the telemetry data;
   receiving an interaction with the icon; and
   in response to receiving the interaction, retrieving, by the text editor, the telemetry data from a telemetry-data repository for display in the text editor.

9. The method of claim 8, wherein the code indicator further includes an instrumentation point detected based on byte code associated with the source code.

10. The method of claim 8, wherein the telemetry data comprises one or more historical log statements, one or more metric counters, or tracing information.

11. The method of claim 8, further comprises retrieving the telemetry data by:
    determining a key-value pair associated with the telemetry data based on the source code;
    locating the key-value pair in the telemetry-data repository; and
    retrieving the telemetry data associated with the key-value pair.

12. The method of claim 8, wherein the telemetry data is first telemetry data and the method further comprises:
    receiving an update to the source code to generate updated source code;
    determining that the updated source code is associated with second telemetry data;
    displaying the icon with the updated source code; and
    in response to receiving an additional interaction with the icon, retrieving the second telemetry data from the telemetry-data repository for display in the text editor.

13. The method of claim 8, wherein the source code is an endpoint, the telemetry data is first telemetry data associated with a first service calling the endpoint, and the method further comprises:
   determining second telemetry data associated with a second service calling the endpoint; and
   displaying, by the text editor, a comparison of the first telemetry data and the second telemetry data.

14. The method of claim 8, wherein the telemetry data comprises historical log statements, metric counters, or tracing information associated with the source code.

15. A non-transitory computer-readable medium comprising program code that is executable by a processor for causing the processor to:
   detect, by a text editor, a code indicator including at least a predefined annotation in source code of software application, the code indicator comprising one or more predefined characters indicating that the source code has telemetry data of performance metrics associated with running the source code and indicating how to locate the telemetry data;
   display, by the text editor and responsive to detecting the code indicator, an icon with the source code, the icon indicating the source code is associated with the telemetry data;
   receive an interaction with the icon; and
   in response to receiving the interaction, retrieve, by the text editor, the telemetry data from a telemetry-data repository for display in the text editor.

16. The non-transitory computer-readable medium of claim 15, wherein the code indicator further includes an instrumentation point detectable based on byte code associated with the source code.

17. The non-transitory computer-readable medium of claim 15, wherein the telemetry data comprises one or more historical log statements, one or more metric counters, or tracing information.

18. The non-transitory computer-readable medium of claim 15, further comprising program code that is executable by the processor for causing the processor to retrieve the telemetry data by:
   determining a key-value pair associated with the telemetry data based on the source code;
   locating the key-value pair in the telemetry-data repository; and
   retrieving the telemetry data associated with the key-value pair.

19. The non-transitory computer-readable medium of claim 15, wherein the telemetry data is first telemetry data and further comprising program code that is executable by the processor for causing the processor to:
   receive an update to the source code to generate updated source code;
   determine that the updated source code is associated with second telemetry data;
   display the icon with the updated source code; and
   in response to receiving an additional interaction with the icon, retrieve the second telemetry data from the telemetry-data repository for display in the text editor.

20. The non-transitory computer-readable medium of claim 15, wherein the source code is an endpoint, the telemetry data is first telemetry data associated with a first service calling the endpoint, and further comprising program code that is executable by the processor for causing the processor to:
   determine second telemetry data associated with a second service calling the endpoint; and
   display, by the text editor, a comparison of the first telemetry data and the second telemetry data.

* * * * *